(12) United States Patent
Fujii

(10) Patent No.: US 6,505,497 B1
(45) Date of Patent: Jan. 14, 2003

(54) ORIENTATION-ADJUSTING DEVICE

(75) Inventor: Nobuyoshi Fujii, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 203 days.

(21) Appl. No.: 09/690,884

(22) Filed: Oct. 18, 2000

(30) Foreign Application Priority Data

Oct. 21, 1999 (JP) ......................... 11-2995087

(51) Int. Cl.$^7$ .................. G01B 21/00; G01B 21/30; G01B 5/28; G01B 21/20
(52) U.S. Cl. ............................ 73/1.89; 33/502
(58) Field of Search ............... 73/1.89, 1.01, 73/1.79, 105; 33/502

(56) References Cited

U.S. PATENT DOCUMENTS

| | | | | |
|---|---|---|---|---|
| 4,048,009 A | * | 9/1977 | Weilbacker | 33/502 X |
| 4,262,423 A | * | 4/1981 | Affa | 33/702 |
| 4,276,766 A | * | 7/1981 | Lucas et al. | 73/1.89 |
| 4,608,758 A | * | 9/1986 | Voelk et al. | 33/706 |
| 4,765,181 A | * | 8/1988 | Numoto et al. | 73/105 |
| 4,888,984 A | * | 12/1989 | Marumo et al. | 73/105 |
| 5,740,616 A | * | 4/1998 | Seddon et al. | 33/554 |
| 6,085,581 A | * | 7/2000 | Jones et al. | 73/1.89 X |
| 6,209,217 B1 | * | 4/2001 | Tsuruta et al. | 702/168 X |
| 6,397,667 B1 | * | 6/2002 | Fujii et al. | 73/105 |
| 2002/0059041 A1 | * | 5/2002 | Mills | 702/127 |

FOREIGN PATENT DOCUMENTS

| | | | | |
|---|---|---|---|---|
| DE | 3134246 | * | 3/1983 | G01B/21/20 |
| DE | 3212082 | * | 10/1983 | 33/546 |
| DE | 3942805 | * | 6/1991 | G01B/21/30 |
| JP | 166764 | | 8/1944 | |
| JP | 62-96810 | | 5/1987 | 73/105 |
| JP | 62-096811 | | 5/1987 | 73/105 |
| JP | 63-107814 | | 7/1988 | G01B/21/30 |
| JP | 4-50701 | * | 2/1992 | 73/105 |
| JP | 4-19461 Y2 | | 5/1992 | G01B/21/30 |
| JP | 6-129810 | | 5/1994 | 33/561.1 |
| JP | 8-122055 A | | 5/1996 | G01B/21/30 |
| JP | 11-248406 | * | 9/1999 | G01B/21/30 |
| JP | 2000-275004 | * | 10/2000 | G01B/21/20 |

OTHER PUBLICATIONS

Derwent–ACC–No.: 1987–327021 Abstract at SU 1303807 A Apr. 1987, Bek Et Al "Flat Surface Quality Profilometer has Calibrated Plate to Set Guides of Measuring Head Parallel to Table and Uses Feelers to Reward Micro—and Macro–irregulalities of Surface".*
(note: not published).

* cited by examiner

Primary Examiner—Thomas P. Noland
(74) Attorney, Agent, or Firm—Oliff & Berridge, PLC

(57) ABSTRACT

An orientation-adjusting device (2) having: a body (20) for holding a surface texture measuring tool (1), an orientation adjuster (30) having a leg rested on a workpiece for adjusting an orientation of the body (20) by adjusting height of the leg; and a height adjuster (40) for vertically moving the surface texture measuring tool in parallel to the body (20) is used for adjusting an orientation of the surface texture measuring tool (1), thus adjusting movement direction (base line (12A) direction) of the surface texture detecting sensor (11) in parallel with the surface of the workpiece. Accordingly, even when the dimension of the workpiece is large, only a space for disposing the body (20) is required on the workpiece, so that surface texture can be measured at high resolution without being restricted by size of the workpiece.

6 Claims, 3 Drawing Sheets

ORIENTATION-ADJUSTING DEVICE

BACKGROUND OF THE INVENTION

1. Field of Invention

The present invention relates to an orientation-adjusting device. More specifically, it relates to an orientation-adjusting device for adjusting orientation of a surface texture measuring tool or a workpiece, the surface texture measuring tool having a surface texture detecting sensor for detecting a surface texture of a workpiece such as surface roughness, waviness and profile, and a driver for moving the surface texture detecting sensor in a base line direction. The present invention includes a device for searching and adjusting a tilt angle of the center locus of a measured value of the roughness, waviness and profile to a base line.

2. Description of Related Art

A surface texture measuring tool having a surface texture detecting sensor for detecting surface texture of a workpiece such as surface roughness and a driver for moving the surface texture detecting sensor in a base line direction is conventionally known.

A problem associated with the surface texture measuring tool is that, when the base line for the surface texture detecting sensor to move on (also referred to as a base line of the driver) is not parallel with the surface of the workpiece, measurement data of the surface texture detecting sensor can rise rightward or leftward, thus exceeding a measurement range of the surface texture detecting sensor. Especially, when the workpiece is measured at high resolution, since the measurement range of the surface texture detecting sensor is narrowed, the measurement data is likely to exceed the measurement range when the surface of the workpiece and the base line of the driver are not parallel.

For solving the above problem, a roughness measuring machine having an orientation-changing means for adjusting the orientation of the workpiece to parallel the surface of the workpiece and the base line of the driver has been proposed (Japanese Utility Model Publication Hei 4-19461).

The roughness measuring machine has a base, an orientation-changing means provided on the base for the workpiece to be put on, a column standing on the base and a roughness sensor vertically movable along the column.

The orientation-changing means has a support shaft standing on the base and a stage liftably supported by the support shaft for the workpiece to be put thereon, where the stage is lifted and lowered being supported by the legs as the supporting points, thus adjusting the orientation of the workpiece.

The roughness sensor has a surface texture detecting sensor for detecting surface roughness of the workpiece and a driver for moving the surface texture detecting sensor in a direction of a base line.

When a surface roughness of a workpiece is measured, a preliminary measurement is conducted for detecting inclination on the surface of the workpiece. During the preliminary measurement, while the workpiece is rested on the stage, the surface texture detecting sensor is moved along the surface of the workpiece to obtain a surface locus of the surface of the workpiece. By calculating a center line of the surface locus, an inclination compensation amount, i.e. a compensation amount to parallel the surface of the workpiece with the base line, can be calculated from the inclination of the center line, and the stage is lifted or lowered for the compensation amount. As a result, since the surface of the workpiece becomes substantially parallel with the base line of the roughness sensor, the surface texture can be measured within the measurement range of the roughness sensor, so that the surface texture can be measured at high resolution.

However, since the above-described orientation-changing means adjusts the orientation of the workpiece after putting the workpiece on the stage, the orientation-changing means can only be used for measuring a light workpiece smaller than the stage. For overcoming the above disadvantage, the size or rigidity of the orientation-changing means may be increased. However, if the orientation-changing means is enlarged, the size of the base for the orientation-changing means to be put on also has to be increased, so that the size of the entire device can be increased, thus being expensive and requiring large installation space.

SUMMARY OF THE INVENTION

An object of the present invention is to provide an orientation-adjusting device of a surface texture measuring device that can be used irrespective of the size of the workpiece and can be economically constructed.

An orientation-adjusting device according to the present invention is for adjusting an orientation of a surface texture measuring tool having a surface texture detecting sensor for detecting a surface texture of a workpiece and a driver for moving the surface texture detecting sensor in a direction of a base line. The orientation-adjusting device is characterized in having: a body for holding the surface texture measuring tool; an orientation adjuster having a leg rested on the workpiece, the orientation adjuster being capable of adjusting an orientation of the body by adjusting a height of the leg; and a height adjuster for vertically moving the surface texture measuring tool in parallel to the body.

According to the present invention, the orientation of the surface texture measuring tool can be adjusted in accordance with the inclination of the surface of the workpiece by adjusting the height of the respective legs of the orientation adjuster while the body holding the surface texture measuring tool is put on the workpiece through the orientation adjuster. In other words, the movement direction (base line direction) of the surface texture detecting sensor can be made parallel with the surface of the workpiece. Accordingly, even when the dimension of the workpiece is large, only a space for resting the body on the workpiece is necessary, so that the surface texture can be measured at high resolution without being restricted by the size of the workpiece. Furthermore, since the single orientation-adjusting device is used irrespective of the size of the workpiece, cost thereof can be reduced as compared to a conventional arrangement.

Further, since the height adjuster for vertically moving the surface texture measuring tool 1 in parallel with the body is provided to the orientation-adjusting device, the surface texture measuring tool can be located at an appropriate height position relative to the surface of the workpiece while the orientation of the surface texture measuring tool is adjusted.

In the orientation-adjusting device according to the present invention, the height adjuster preferably includes: a guide provided to the body; a slide member vertically slidable relative to the guide and having the surface texture measuring tool secured thereto; and an elevating mechanism for vertically moving the slide member along the guide.

According to the present invention, since the surface texture measuring tool is vertically moved along the guide through the slide member, the surface texture measuring tool can be easily and stably moved vertically while being in parallel with the body. Further, since the structure of the height adjuster is simple, production thereof can be facilitated.

In the orientation-adjusting device according to the present invention, the elevating mechanism may preferably include: a threaded shaft rotatably supported to the body, the threaded shaft being indisplaceable in an axial direction, the threaded shaft having one end screwed to the slide member and the other end projecting from the body; and a knob secured to the other end of the threaded shaft.

According to the present invention, when the knob of the height adjuster is rotated, the threaded shaft is rotated keeping the position thereof, thus vertically moving the slide member screwed to the threaded shaft. Accordingly, the surface texture measuring tool can be manually moved vertically, and structure thereof is simpler as compared to the arrangement having a motor etc., thus reducing production cost thereof.

In the orientation-adjusting device according to the present invention, the orientation adjuster may preferably include: first and second legs height adjustably screwed to one end of the body on both sides of the base line; and a third leg height adjustably screwed to an opposing end of the body on the base line.

According to the present invention, since the orientation adjuster has the first leg and the second leg screwed to one end of the body and on both sides of the base line with its height being adjustable, and the third leg screwed to the other end of the body on the base line with its height being adjustable, the orientation-adjusting device can be rested on a workpiece having a cylindrical outer surface etc. in a well-balanced manner. Further, the body (i.e. the surface texture measuring tool) can be inclined in the base line direction by adjusting the height of the third leg relative to the first and the second legs, and the body can be inclined in a direction orthogonal with the base line by adjusting the height of the first and the second legs. Further, by adjusting the height of the first and the second legs, the orientation-adjusting device can be rested on a cylindrical workpiece having a different diameter in a well-balanced manner.

In the orientation-adjusting device according to the present invention, the orientation-adjusting device may preferably be detachable from the surface texture measuring tool.

According to the present invention, since the orientation-adjusting device is detachable relative to the surface texture measuring tool, the orientation-adjusting device may be attached to the surface texture measuring tool only when the orientation of the surface texture measuring tool is necessary to be adjusted, thus enabling application of the orientation-adjusting device to a conventional surface texture measuring tool.

In the orientation-adjusting device according to the present invention, a flat portion capable of resting the workpiece may preferably be formed on an upper side of the body.

According to the present invention, since a flat portion capable of resting the workpiece thereon is formed on an upper side of the body, the orientation of the workpiece can be adjusted by using the orientation-adjusting device as the stage when the workpiece is small. In this case, the surface texture measuring tool may preferably be attached to a stand etc.

DETAILED DESCRIPTION OF PREFERRED EMBODIMENTS

An embodiment of the present invention will be described below with reference to attached drawings.

Figure 1:
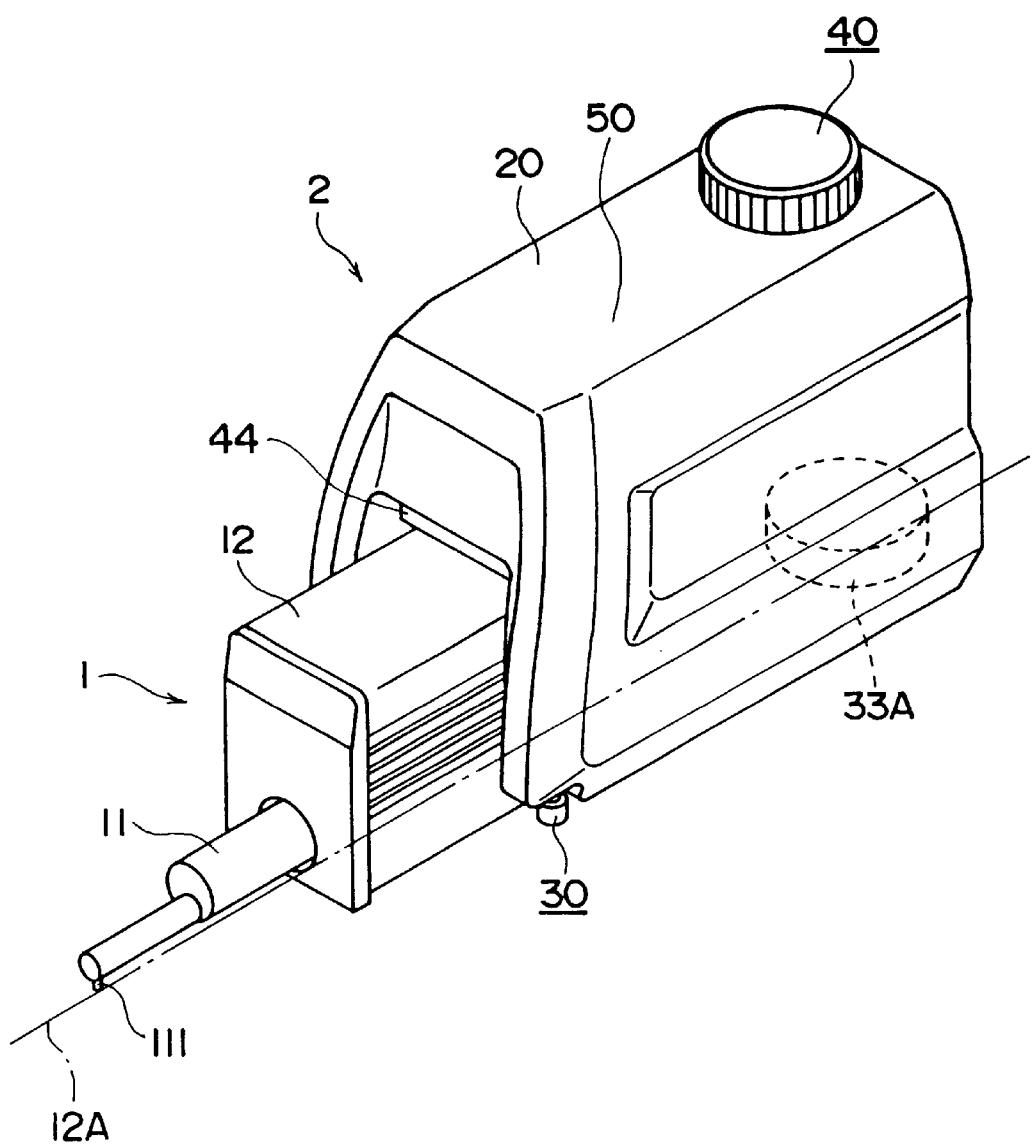
FIG. 1 is an entire perspective view showing an embodiment of an orientation-adjusting device according to the present invention.
Figure 2:
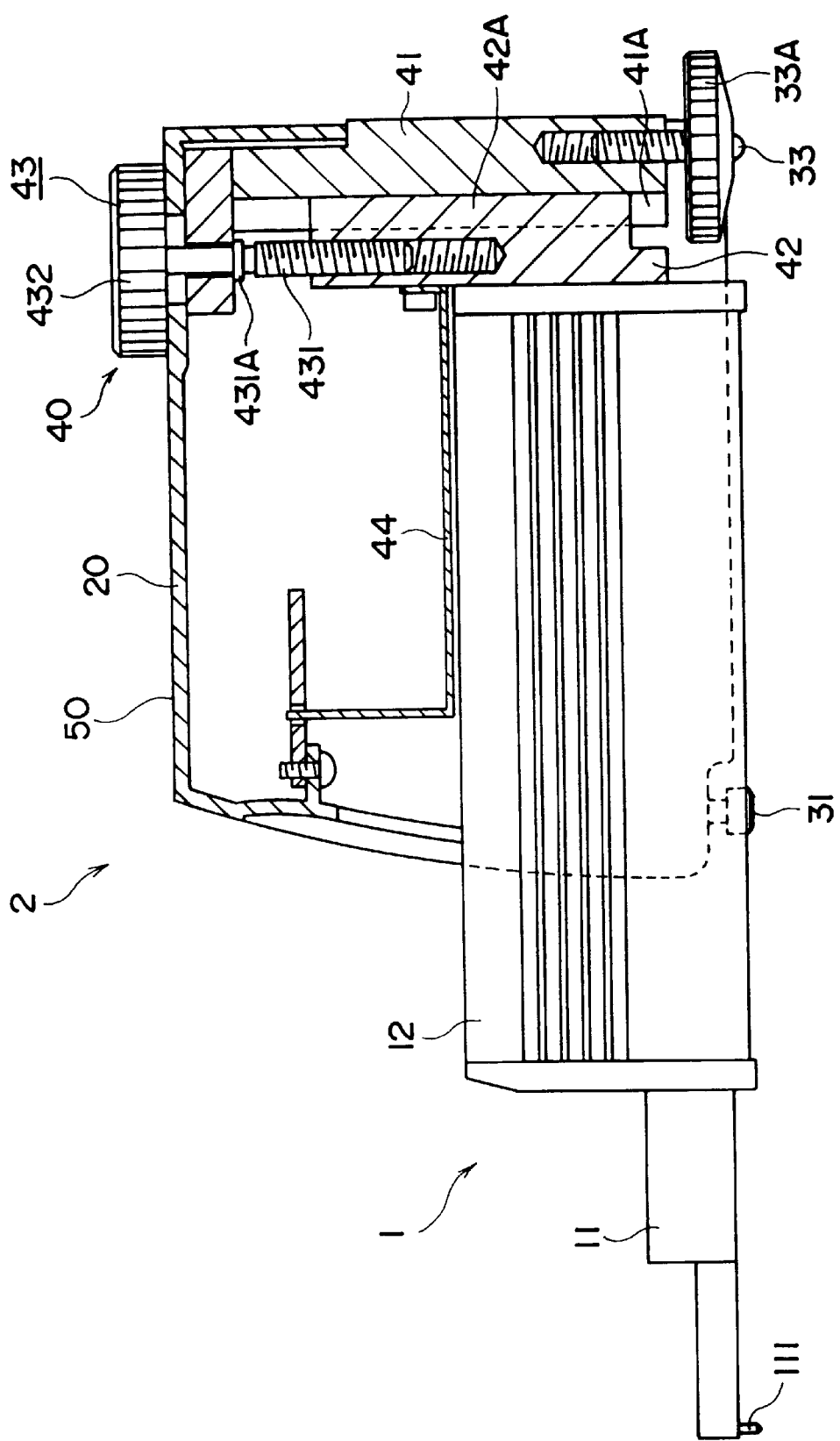
FIG. 2 is a vertical cross section of the aforesaid embodiment.
Figure 3:
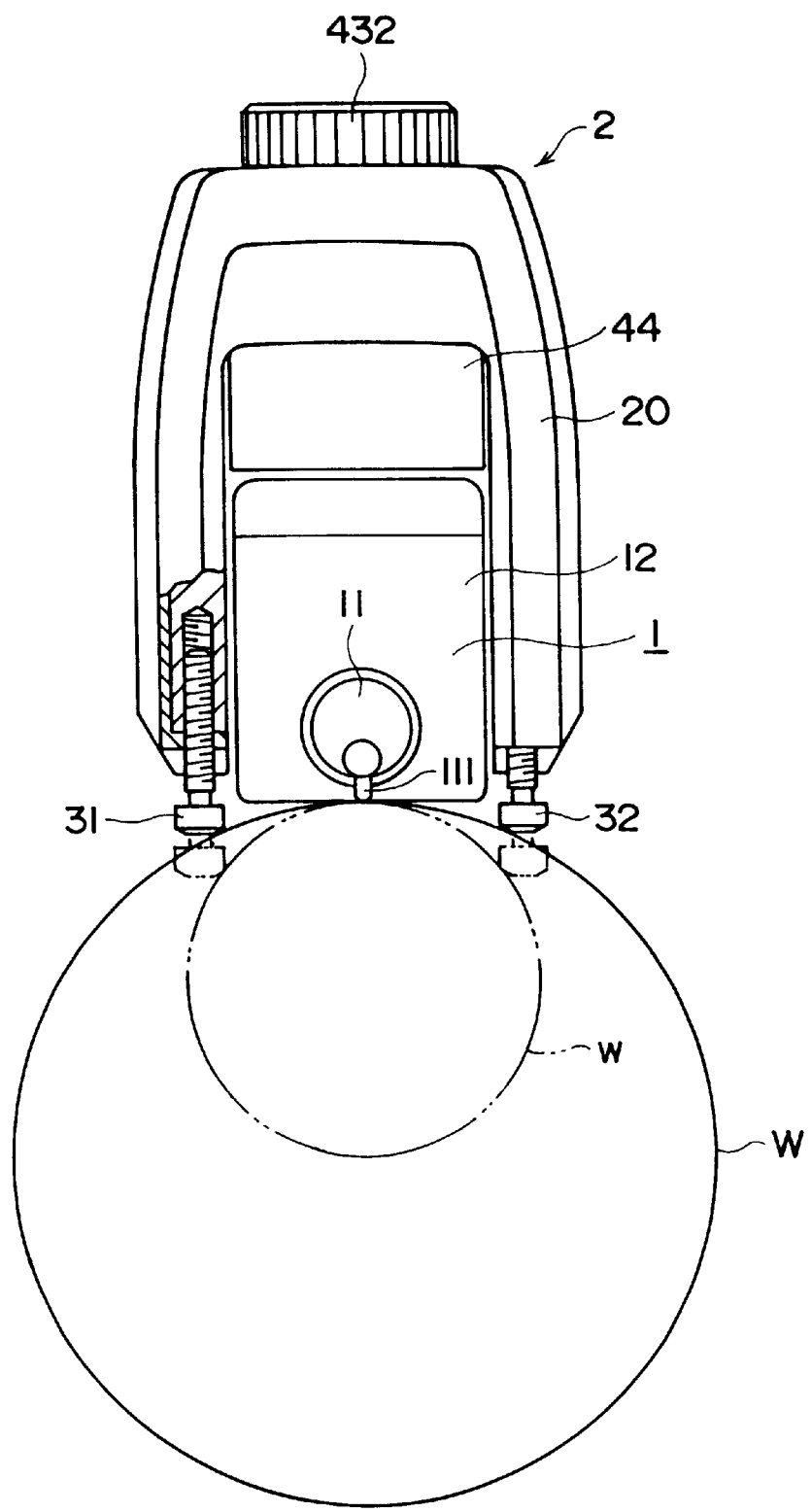
FIG. 3 is a front elevation showing a function of the aforesaid embodiment.

FIG. 1 shows an orientation-adjusting device 2 holding a surface texture measuring tool 1 for scanning surface roughness of a workpiece, FIG. 2 shows a vertical cross section of the orientation-adjusting device 2 and FIG. 3 shows a front elevation of the orientation-adjusting device 2.

Surface texture measuring tool 1 has a surface texture detecting sensor 11 for detecting surface roughness etc. of the workpiece based on a vertical displacement of a stylus 111 to be in contact with the surface of the workpiece, and a driver 12 (such as a motor) for moving the surface texture detecting sensor 11 in a base line 12A direction.

The orientation-adjusting device 2 has a body 20 for holding the surface texture measuring tool 1, an orientation adjuster 30 for adjusting the orientation of the body 20, and a height adjuster 40 for vertically moving the surface texture measuring tool 1 in parallel with the body 20, the orientation-adjusting device 2 being detachable from the surface texture measuring tool 1.

The body 20 is formed in an approximate C-shape and holds and covers the surface texture measuring tool 1 from an upper side, where a stylus 111 side of the surface texture measuring tool projects from a front opening of the body 20. A flat portion 50 capable of receiving the workpiece is formed on an upper side of the body 20.

The orientation adjuster 30 is composed of three legs perpendicularly screwed to a lower side of the body 20. Specifically, the orientation adjuster 30 is composed of a first leg 31 and a second leg 32 screwed to one end of the body 20 and provided on both sides of the base line 12A, the first leg 31 and the second leg 32 being capable of adjusting height thereof, and a third leg 33 screwed to an opposing end of the body 20 and provided on the base line 12A, the third leg 33 also being capable of adjusting the height thereof The third leg 33 has a knob 33A. When the knob 33A is rotated to adjust height of the third leg 33, the body 20 is inclined while being supported by the first and the second legs 31 and 32 as supporting points, thus adjusting orientation of the body 20. In other words, the orientation of the surface texture measuring tool 1 secured to the body 20 is adjusted in the base line 12A direction. Incidentally, one rotation of the knob 33A inclines the body 20 for 0.3 degree and any desirable inclination angle can be applied to the body 20 by forming a scale (not shown) to the knob.

Further, by adjusting height of the first and the second legs 31 and 32 respectively in the same manner as the third leg 33, the orientation of the body 20 (i.e. surface texture measuring tool 1) can be adjusted in a direction orthogonal with the base line 12A.

The height adjuster 40 has a guide 41 provided to the body 20, a slide member 42 vertically slidable relative to the guide 41 and securing the surface texture measuring tool 1, and an elevating mechanism for vertically moving the slide member 42 along the guide 41. Incidentally, the slide member 42 has an approximately L-shaped cover 44 for shutting the front opening of the body 20 thus preventing invasion of dust etc. into the inside of the body 20.

The guide 41 has a vertically extending concave thread 41A and a convex thread 42A is formed on the slide member 42 corresponding to the concave thread 41A, so that the slide member 42 is vertically moved while being fitted to the guide 41.

The elevating mechanism 43 has a threaded shaft 431 rotatably supported by the body 20 and having an end screwed to the slide member 42 and the other end projecting from the body 20, and a knob 432 secured to the other end of the threaded shaft 431. A lock ring 431 A is provided to an upper side of a male screw portion of the threaded shaft 431, the lock ring 431 A preventing displacement of the threaded shaft 431 in an axial direction relative to the body 20.

The threaded shaft 431 rotates at the position by rotating the knob 432. Then, the slide member 42 screwed to the threaded shaft 431 vertically moves along the guide 41 of the body 20, so that the surface texture measuring tool 1 and the cover 44 are integrally vertically moved. Incidentally, one rotation of the knob 432 lifts or lowers the surface texture measuring tool 1 for 0.5 mm relative to the body 20.

Next, a function of the present embodiment will be described below.

As shown in FIG. 3, surface roughness of a workpiece W (solid line) having a large cylindrical surface is measured for instance, a preliminary measurement is conducted for obtaining inclination of the workpiece W in the same manner as the conventional art. During the preliminary measurement, while the orientation-adjusting device 2 holding the surface texture measuring tool 1 is rested on the workpiece W, the surface texture detecting sensor 11 is moved along a surface of the workpiece W to obtain a surface locus of the workpiece W. By obtaining the center line of the surface locus, the inclination compensation amount, i.e. a compensation amount for making the surface of the workpiece W parallel with the base line 12A, can be obtained. Accordingly, the height of the third leg 33 of the orientation adjuster 30 is adjusted to correct the orientation of the body 20 and the surface texture measuring tool 1.

Specifically, when the inclination of the surface of the workpiece W relative to the base line 12A is obtained, the compensation amount for compensating the inclination of the surface texture measuring tool is displayed on a displaying means (not shown). In compensating the inclination, in order to avoid excessive force being applied to the stylus 111 of the surface texture detecting sensor 11, the knob 432 of the elevating mechanism 43 is rotated to lift the surface texture measuring tool 1 to move the stylus 111 away from the workpiece W. Subsequently, the knob 33A of the third leg 33 of the orientation adjuster 30 is rotated by a predetermined amount in a predetermined rotation direction, thus adjusting the orientation of the body 20 and the surface texture measuring tool 1.

Thereafter, the knob 432 of the height adjuster 40 is rotated again to lower the surface texture measuring tool, so that the stylus 111 is in contact with the workpiece W. At this time, the measurement range of the surface texture measuring tool 1 is switched into a desired range and the height position of the surface texture measuring tool 1 is minutely adjusted by the knob 432 of the height adjuster 40, so that the displacement of the stylus 111 comes to an approximately intermediate position of the measurement range.

As a result, since the base line 12A of the surface texture measuring tool 1 and the surface of the workpiece W can be made substantially parallel, the surface texture measurement (referred to actual measurement hereinafter) can be conducted at high resolution without going beyond the measurement range of the surface texture measuring tool 1.

On the other hand, when the surface roughness of the workpiece W (shown in double-dotted line) having smaller diameter than the above workpiece W is measured, the surface texture measuring tool 1 can be unstable on the workpiece W if the height of the first and the second legs 31 and 32 remains the same as in the large workpiece W. In order to avoid the problem, the first and the second legs 31 and 32 are extended for the same length to adjust the height of the respective legs 31 and 32 as shown in double-dotted line in FIG. 3, so that the surface texture detecting sensor 11 is in contact with the workpiece at an appropriate height position. Further, the height of the surface texture detecting sensor 11 is adjusted by the height adjuster 40 provided to the orientation-adjusting device 2. After the orientation-adjusting device 2 (i.e. the surface texture measuring tool 1) is put on the workpiece W, the preliminary measurement, orientation adjustment of the surface texture measuring tool and actual measurement are sequentially conducted in the same manner as the measurement of the above-described workpiece W.

Further, in order to measure a surface roughness of a small workpiece where the orientation adjustment device 2 cannot be put thereon, the orientation-adjusting device 2 is detached from the surface texture measuring tool 1 and the workpiece is put on the flat portion 50 formed on the upper side of the body 20. On the other hand, the surface texture measuring tool 1 is attached to a stand, etc. Initially, the inclination compensation amount is measured by the preliminary measurement. The orientation of the workpiece is adjusted by rotating the knob 33A of the third leg 33 of the orientation adjuster 30 in accordance with the inclination compensation amount. Accordingly, when the base line 12A of the surface texture measuring tool 1 and the surface of the workpiece can be made substantially parallel, the actual measurement is conducted. In other words, in the known roughness measuring machine having the orientation-changing means for adjusting the orientation of the workpiece (such as the roughness measuring machine disclosed in Japanese Utility Model Publication No. Hei 4-19461), the orientation-adjusting device 2 may be used instead of the orientation-changing means for the workpiece to be put on, thus enabling manual inclination adjustment of the workpiece.

According to the above-described present embodiment, the following effects can be obtained.

In the above embodiment, the orientation of the surface texture measuring tool can be adjusted in accordance with the inclination of the surface of the workpiece by adjusting the height of the respective legs 31, 32 and 33 of the orientation adjuster 30 while the body 20 holding the surface texture measuring tool 1 is put on the workpiece through the orientation adjuster 30. In other words, the movement direction (base line 12A direction) of the surface texture detecting sensor 11 can be made parallel with the surface of the workpiece. Accordingly, even when the dimension of the workpiece is large, only a space for resting the body 20 on the workpiece is necessary, so that the surface texture can be measured at high resolution without being restricted by the size of the workpiece. Furthermore, since the single orientation-adjusting device 2 is used irrespective of the size of the workpiece, cost thereof can be reduced as compared to a conventional arrangement.

Further, since the height adjuster 40 for vertically moving the surface texture measuring tool 1 in parallel with the body 20 is provided to the orientation-adjusting device 2, the surface texture measuring tool can be located at an appropriate height position relative to the surface of the workpiece while the orientation of the surface texture measuring tool 1 is adjusted. Further, the displacement of the stylus 111 of the surface texture detecting sensor 11 can be located at an appropriate position within the measurement range of the surface texture detecting sensor 11.

Since the surface texture measuring tool 1 is vertically moved along the guide 41 through the slide member 42, the surface texture measuring tool can be easily and stably moved vertically while being in parallel with the body 20. Further, since the structure of the height adjuster 40 is simple, production thereof can be facilitated.

When the knob 432 of the height adjuster 40 is rotated, the threaded shaft 431 is rotated keeping the position thereof, thus vertically moving the slide member 42 screwed to the threaded shaft 431. Accordingly, the surface texture measuring tool 1 can be manually moved vertically, and structure thereof is simpler as compared to the arrangement having a motor etc., thus reducing production cost thereof.

Since the orientation adjuster 30 has the first leg 31 and the second leg 32 screwed to one end of the body 20 and on both sides of the base line 12A with its height being adjustable, and the third leg 33 screwed to the other end of the body 20 on the base line 12A with its height being adjustable, the orientation-adjusting device 2 can be rested on a workpiece having a cylindrical outer surface etc. in a well-balanced manner. Further, the body 20 (i.e. the surface texture measuring tool 1) can be inclined in the base line 12A direction by adjusting the height of the third leg 33 relative to the first and the second legs 31 and 32, and the body 20 can be inclined in a direction orthogonal with the base line 12A by adjusting height of the first and the second legs 31 and 32. Further, by adjusting the height of the first and the second legs 31 and 32, the orientation-adjusting device 2 can be rested on a cylindrical workpiece having a different diameter in a well-balanced manner.

Since the orientation-adjusting device 2 is detachable relative to the surface texture measuring tool 1, the orientation-adjusting device 2 may be attached to the surface texture measuring tool 1 only when the orientation of the surface texture measuring tool 1 is necessary to be adjusted, thus enabling application of the orientation-adjusting device 2 to a conventional surface texture measuring tool.

Since a flat portion 50 capable of resting the workpiece thereon is formed on an upper side of the body 20, the orientation of the workpiece can be adjusted by using the orientation-adjusting device 2 as the stage when the workpiece is small. In this case, the surface texture measuring tool 1 may be attached to a stand, etc.

Since the third leg 33 of the orientation adjuster 30 has a knob 33A having a scale, desired inclination angle can be applied to the surface texture measuring tool 1. Incidentally, though one rotation of the knob 33A of the present embodiment inclines the surface texture measuring tool 1 for 0.3 degree being supported by the first and the second legs 31 and 32, the angle may be set in a different manner. The same should also be applied to the knob 432 of the elevating mechanism 43 of the height adjuster 40.

Since a cover 44 is attached to the slide member 42 of the height adjuster 40 and the cover 44 is vertically moved integrally with the slide member 42 and the surface texture measuring tool 1, invasion of dust etc. into the inside of the body 20, especially into the height adjuster 40 can be more securely prevented and appearance thereof can be improved.

Incidentally, the scope of the present invention is not restricted to the above embodiment, but may include modification and variation as long as an object of the present invention can be achieved.

For instance, though the cover 44 is attached to the slide member 42 in the above embodiment, the arrangement of the present invention is not restricted and the cover may be omitted.

Though the knob 33A having the scale is provided to the third leg 33 of the orientation adjuster 30 in the above embodiment, the present invention is not restricted but the knob may have no scale or the knob itself can be omitted. However, since adjustment of the inclination of the surface texture measuring tool into a desired angle can be difficult without the knob having the scale, the knob having the scale is preferably provided.

Though the scale may represent the rotation angle of the knob when the knob has the scale, the scale may preferably represent the angle of the surface texture measuring tool to be corrected by rotating the knob. Further, the scale is not restricted to the rotation angle of the knob or the corrected inclination angle of the surface texture measuring tool, but may be any scale related to the compensation amount displayed onto the displaying means.

Though the knob and the scale are not provided to the first and the second legs 31 and 32 of the orientation adjuster 30 in the above embodiment, the first and the second legs may preferably have the knob and the scale, thus facilitating adjustment of the height of the first and the second legs. Further, another single easily-operable knob may be provided independently of the knobs provided to the first and the second legs, the knob being operable to cooperate with the first and the second legs to adjust the height of the legs. Incidentally, such a cooperation mechanism may preferably be constructed by a screw or a gear wheel.

Though the knob 432 of the elevating mechanism 43 has no scale in the above embodiment, the scale may preferably be provided. In this case, the height adjustment amount of the surface texture measuring tool 1 by operating the knob 432 can be easily recognized.

In the above embodiment, though the orientation-adjusting device 2 is provided to the surface texture measuring tool 1 in a detachable manner, the orientation-adjusting device according to the present invention is not restricted the arrangement but the orientation-adjusting device may not be detachable. However, since the orientation-adjusting device can be used as the stage when the workpiece is small, applicability of the orientation-adjusting device can be enlarged by the detachable arrangement.

Though the orientation adjuster 30 is composed of three legs 31, 32 and 33 in the above embodiment, the orientation adjuster of the present invention is not restricted thereto but may be composed of one, two or more than three legs.

Though the elevating mechanism 43 of the height adjuster 40 is composed of the threaded shaft 431 and the knob 432 in the above embodiment, the elevating mechanism according to the present invention is not restricted the arrangement but a motor, etc. may be used.

The concave thread 41A formed on the guide 41 of the above embodiment may be a so-called dovetail groove. In this case, the convex thread 42A formed on the slide member 42 may have a shape capable of fitment to the dovetail groove.

Further, so-called gib may be inserted between the slide member 42 and the guide 41, thus appropriately adjusting the gap between the slide surfaces. According to the present arrangement, shakiness of the slide member can be reduced.

Though the threaded shaft 431 is directly screwed to the slide member 42 by the height adjuster 40, the slide member 42 may be secured to a nut and the threaded shaft may be screwed to the nut. In this case, the gap between the threaded shaft and the nut can be adjusted by forming a slit to the nut and adjusting the interval of the slit by a bolt etc., so that shakiness of the elevating mechanism can be reduced, thus improving operability of the height adjuster and further minutely adjusting height of the surface texture measuring tool.

In the above embodiment, the surface texture measuring tool 1 may be attached to the slide member 42 in various ways. For instance, the surface texture measuring tool may be secured by a bolt, or a wing screw, or engaged by a hook.

What is claimed is:

1. An orientation-adjusting device for adjusting an orientation of a surface texture measuring tool having a surface texture detecting sensor for detecting a surface texture of a workpiece and a driver for moving the surface texture detecting sensor in a direction of a base line, the orientation-adjusting device comprising:

a body for holding the surface texture measuring tool;

an orientation adjuster having a leg rested on the workpiece, the orientation adjuster being capable of adjusting an orientation of the body by adjusting a height of the leg; and a height adjuster for vertically moving the surface texture measuring tool in parallel to the body.

2. The orientation-adjusting device according to claim 1, the height adjuster comprising: a guide provided to the body; a slide member vertically slidable relative to the guide and having the surface texture measuring tool secured thereto; and an elevating mechanism for vertically moving the slide member along the guide.

3. The orientation-adjusting device according to claim 2, the elevating mechanism comprising: a threaded shaft rotatably supported to the body, the threaded shaft being indisplaceable in axial direction, the threaded shaft having one end screwed to the slide member and the other end projecting from the body; and a knob secured to the other end of the threaded shaft.

4. The orientation-adjusting device according to claim 1, the orientation adjuster comprising:

first and second legs height adjustably screwed to one end of the body on both sides of the base line; and a third leg height adjustably screwed to an opposing end of the body on the base line.

5. The orientation-adjusting device according to claim 1, wherein the orientation-adjusting device is detachable from the surface texture measuring tool.

6. The orientation-adjusting device according to claim 1, wherein a flat portion capable of resting the workpiece is formed on an upper side of the body.

* * * * *